United States Patent
Pandey

(10) Patent No.: US 12,444,763 B2
(45) Date of Patent: Oct. 14, 2025

(54) MODE SELECTIVE ELECTRODE ASSEMBLY, UNITIZED REGENERATIVE FUEL CELL COMPRISING THE SAME AND METHOD THEREOF

(71) Applicant: L&T TECHNOLOGY SERVICES LIMITED, Tamil Nadu (IN)

(72) Inventor: Indu Pandey, Uttar Pradesh (IN)

(73) Assignee: L&T TECHNOLOGY SERVICES LIMITED, Tamil Nadu (IN)

( * ) Notice: Subject to any disclaimer, the term of this patent is extended or adjusted under 35 U.S.C. 154(b) by 610 days.

(21) Appl. No.: 17/884,204

(22) Filed: Aug. 9, 2022

(65) Prior Publication Data

US 2023/0411659 A1 Dec. 21, 2023

(30) Foreign Application Priority Data

Jun. 20, 2022 (IN) .............................. 202241035332

(51) Int. Cl.
*H01M 8/0656* (2016.01)
*C25B 1/04* (2021.01)
*H01M 8/04082* (2016.01)
*H01M 8/18* (2006.01)

(52) U.S. Cl.
CPC .............. *H01M 8/0656* (2013.01); *C25B 1/04* (2013.01); *H01M 8/04201* (2013.01); *H01M 8/186* (2013.01)

(58) Field of Classification Search
CPC ...... H01M 8/0656; H01M 8/18; H01M 8/184; H01M 8/186; H01M 8/04201; C25B 1/04
See application file for complete search history.

(56) References Cited

U.S. PATENT DOCUMENTS

| 9,214,694 | B2 | 12/2015 | Dubois et al. | |
|---|---|---|---|---|
| 2021/0066741 | A1* | 3/2021 | Park | H01M 4/9016 |
| 2021/0388515 | A1* | 12/2021 | Ding | C25B 11/053 |
| 2023/0037065 | A1* | 2/2023 | Cho | H01M 8/04455 |

FOREIGN PATENT DOCUMENTS

| CN | 111146471 | * | 5/2020 |
|---|---|---|---|
| KR | 102359808 | B1 | 2/2022 |

OTHER PUBLICATIONS

CN111146471 English translation. Chen et al. China. May 12, 2020. (Year: 2020).*

\* cited by examiner

*Primary Examiner* — Christopher P Domone
(74) *Attorney, Agent, or Firm* — Kendal M. Sheets

(57) ABSTRACT

The present disclosure relates to mode selective electrode assembly. Further, the present disclosure relates to a unitized regenerative fuel cell comprising a mode selective electrode assembly which operates in dual mode that is electrolysis cell mode and fuel cell mode. The unitized regenerative fuel cell further comprises of at least two gas storage tanks with pressure sensors for storing hydrogen gas and oxygen gas, a water storage tank with pressure sensor, an external energy source, and a power reservoir for storing energy. The mode selective electrode assembly comprises a mode switching system that automatically changes the electrode assembly from an electrolysis cell mode to a fuel cell mode and/or from a fuel cell mode to an electrolysis cell mode, by changing the reactive polymeric layers of the electrodes. The present disclosure also relates to a method for operating a unitized regenerative fuel cell.

9 Claims, 6 Drawing Sheets

MODE SELECTIVE ELECTRODE ASSEMBLY, UNITIZED REGENERATIVE FUEL CELL COMPRISING THE SAME AND METHOD THEREOF

RELATED APPLICATION

This application claims the benefit of Indian Patent Application No. 202241035332 filed on Jun. 20, 2022 with the Intellectual Property Office of India, which is hereby incorporated by reference in its entirety.

FIELD OF THE INVENTION

The present disclosure relates to a hydrogen fuel cell. Particularly, the present disclosure relates to a mode selective electrode assembly. More particularly, the present disclosure relates to a unitized regenerative fuel cell (URFC) comprising a mode selective electrode assembly. The URFC operates in dual mode that is electrolysis cell mode and fuel cell mode. Further, the present disclosure relates to a method for operating a URFC.

BACKGROUND OF THE INVENTION

Green hydrogen gas has been known as a promising fuel and is a sustainable alternative of fossil fuels for producing electricity. Unitized regenerative fuel cells (URFCs) based on proton exchange membrane utilize water to produce green hydrogen and electricity. The advantage of URFCs over other systems is that it works as a single device and carries out both the process of electrolysis of water as well as the process of recombining of the hydrogen and oxygen gas to produce electricity. In other words, the URFC "charges" and "discharges" like a rechargeable battery. While charging, the URFC operates the electrolysis cell mode, which splits water into hydrogen and oxygen. While discharging, the URFC operates the fuel cell mode, which combines hydrogen and oxygen and produces electricity. Thus, making operation of the URFC much simpler than other systems.

Electrodes of URFC are bifunctional in nature to complete both modes. With time these electrodes accomplishing both modes in switch-on/switch off modes faces electrode material degradation, reduction in durability, decrease in round-trip efficiencies, water flood issues, sluggish kinetics of 'hydrogen-oxygen reactions and high risk of merging reactant ($H_2$ and $O_2$) gases.

Patent literature U.S. Pat. No. 9,214,694B2 discloses a URFC provided with optimized activity both when the cell is operated in the electrolysis mode and in the energy generation mode. The membrane-electrode assembly for use in a reversible fuel cell comprises an ion conductive membrane having first and second surfaces; a first electrocatalyst layer in contact with the first surface of the membrane and comprises a discrete electrolysis-active area and a discrete energy generation-active area. A second electrocatalyst layer is placed in contact with the second surface of the membrane and comprises a discrete electrolysis-active area and a discrete energy generation-active area.

Patent literature KR102359808B1 discloses an integrated regenerative fuel cell including the membrane electrode assembly to improve performance of the fuel cell without degradation of the performance of water electrolysis. The integrated regenerative fuel cell is designed by appropriately adjusting the hydrophilic electrode of the water electrolysis and the hydrophobic electrode of the fuel cell in which the water electrolysis device and the fuel cell device are combined into one.

However, it is challenging to maintain the performance URFC's bifunctional cell in each mode to that of the corresponding property of a separate electrolysis cell and fuel cell. The problem with such configuration is that the kinetically and thermodynamically controlled oxidation and reduction reactions are both integrated into same side of the devise, leading to lack of efficiencies. Thus, there still exists a need for URFC which is capable to operate with the highest efficiency in both the modes i.e., in the fuel cell mode and in the electrolysis cell mode. The present disclosure provides a mode selective electrode assembly and a URFC comprising a mode selective electrode assembly which operates in dual mode by automatically switching from electrolysis cell mode to fuel cell mode and vice versa. This new URFC overcomes the mixing of reactant gases and water, reduces electrode degradation resulting into robust, high round trip efficiency and high lifetime of the URFC.

SUMMARY OF THE INVENTION

The present disclosure relates to a mode selective electrode assembly. Further, the present disclosure relates to a unitized regenerative fuel cell comprising a mode selective electrode assembly. The URFC comprising a mode selective electrode assembly operates in dual mode that is electrolysis cell mode and fuel cell mode. The URFC comprises of a mode selective electrode assembly, at least two gas storage tanks with pressure sensor for storing hydrogen gas and oxygen gas, a water storage tank with pressure sensor, an external energy source, and a power reservoir for storing energy. The mode selective electrode assembly comprises a mode switching system that automatically switches from an electrolysis cell mode to a fuel cell mode and from a fuel cell mode to an electrolysis cell mode, by changing the reactive polymeric layers of the electrodes.

Further, the present disclosure relates to a method for operating a URFC. The URFC of the present disclosure overcomes the issue of mixing of reactant gases and water, reduces electrode degradation and resulting into high lifetime of the URFC. The URFC of present disclosure exhibits high energy density and round-trip efficiency of about 85% with 12,000-20,000 cycles.

BRIEF DESCRIPTION OF ACCOMPANYING DRAWINGS

The present disclosure will be further understood with reference to the accompanying drawings. More specifically, the purposes of drawings are to illustrate the preferred and alternate embodiments and are not to be construed as limitations. Furthermore, drawings are not drawn to scale.

FIG. 1 shows the schematic diagram of mode selective electrode assembly.

FIGS. 2(A) and 2(B) show the working mechanism of unitized regenerative fuel cell with mode selective electrode assembly.

DETAILED DESCRIPTION OF THE INVENTION

While the disclosure is susceptible to various modifications and alternative forms, specific aspect thereof has been shown by way of example and will be described in detail below. It should be understood, however that it is not intended to limit the invention to the particular forms disclosed, but on the contrary, the invention is to cover all modifications, equivalents, and alternative falling within the scope of the invention.

Before describing in detail embodiments, it is to be noted that a person skilled in the art can be motivated from the present disclosure and modify the various constructions of system and method. However, such modification should be construed within the scope of the invention. Accordingly, applicant would like to mention that the examples and comparative studies are mentioned to show only those specific details that are pertinent to understanding the embodiments of the present invention so as not to obscure the disclosure with details that will be readily apparent to those of ordinary skill in the art having benefit of the description herein.

The terms "comprises", "comprising", or any other variations thereof, are intended to cover a non-exclusive inclusion, that comprises a list of components does not include only those components but may include other components not expressly listed or inherent to such system or device. In other words, one or more elements in a system or method proceeded by "comprises . . . a" does not, without more constraints, preclude the existence of other elements or additional elements in the system or method.

The present disclosure discloses a mode selective electrode assembly, comprising
at least two electrodes having reactive polymeric layers on each side;
a proton exchange membrane;
a mode switching system,
wherein the mode switching system changes from an electrolysis cell mode to a fuel cell mode or from a fuel cell mode to an electrolysis cell mode by folding up the polymeric reactive layers of the electrodes by folding up the polymeric reactive layers of the electrodes.

In one of the embodiments, the mode selective electrode assembly optionally comprises of microporous layers, gas diffusion layers and bipolar plates.

The present disclosure further discloses a unitized regenerative fuel cell comprising,
a mode selective electrode assembly,
at least two gas storage tanks with pressure sensor for storing hydrogen gas and oxygen gas,
a water storage tank with pressure sensor,
an external energy source, and
a power reservoir for storing energy,
wherein the mode selective electrode assembly, comprises of
at least two electrodes having reactive polymeric layers on each side;
a proton exchange membrane; and
a mode switching system, wherein the mode switching system changes from an electrolysis cell mode to a fuel cell mode or from a fuel cell mode to an electrolysis cell mode by folding up the polymeric reactive layers of the electrodes.

Figure 1:
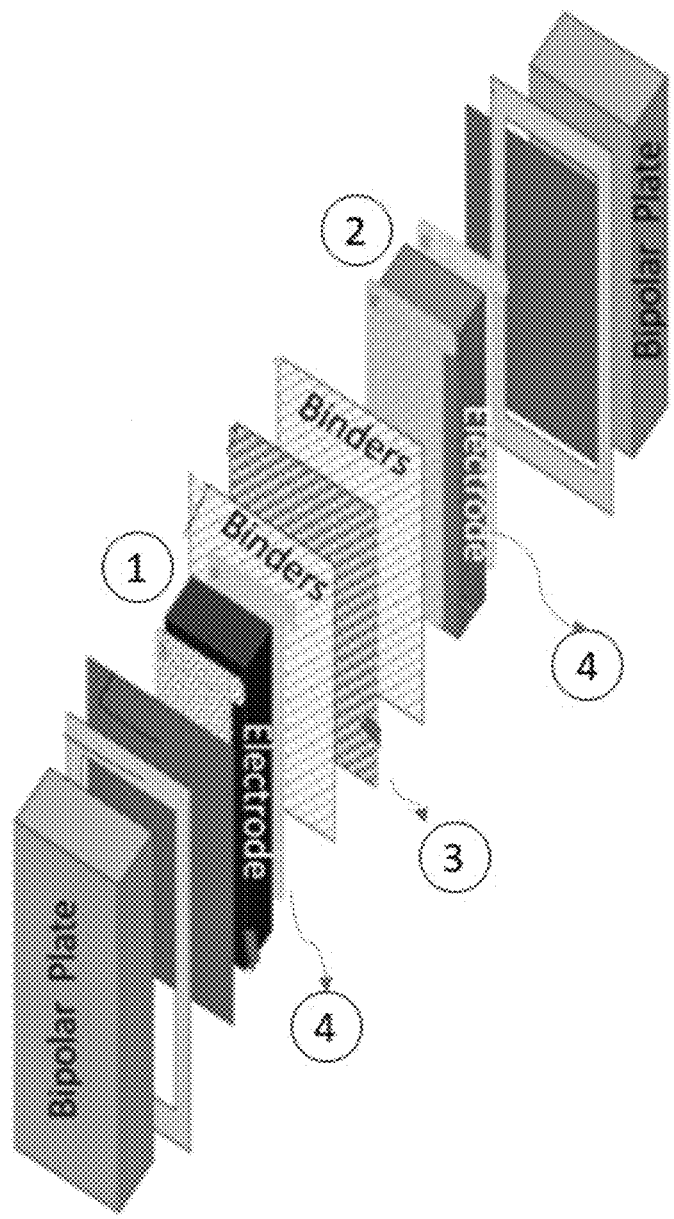

FIG. 1 represents the schematic diagram of mode selective electrode assembly. The term "mode selective" refers to the feature of the electrode assembly by which the mode from an electrolysis cell mode to a fuel cell mode and/or from a fuel cell mode to an electrolysis cell mode is automatically switched, by changing the reactive polymeric layers of the electrodes.

In one of the embodiments, the mode selective electrode assembly comprises of two electrodes—a first electrode (1), and—a second electrode (2) and a proton exchange membrane.

In another one of the embodiments, the first and second electrodes have reactive polymeric layer (4) on each side.

The first (1) and second electrode (2) with reactive polymer layer (4) has folding properties wherein water acts as stimulus. The mode selective electrode assembly comprise bipolar plates on side of the first (1) and second (2) electrodes. The corrosion resistant bipolar plates comprise of Ti—Zr—N—S doped film. The main functions of bipolar plates are transportation of the electrical current and of spreading fuel from cell to cell. In URFC, the gas diffusion backing, consists of a prosperous structured mesoporous or microporous layer. Microporous layers and gas diffusion layers based of activated carbon cloths/exfoliated graphite film are placed between the bipolar plates and the electrodes. In a URFC, gas diffusion backing provides the major functional properties such as homogeneous distribution of fuels, water management, and electrical conductivity between the electrodes and bipolar plates.

The proton exchange membrane (3) comprises binder compose of polyvinylidene fluoride layer on each side. The proton exchange membrane is selected from but not limited to biodegradable polymers and inorganic nanofillers such as chitosan, polyaniline-silica-titania. The proton exchange membrane enhances the conductivity by shorting the proton hopping distance.

The mode selective electrode assembly comprises a mode switching system that automatically switches from an electrolysis cell mode to a fuel cell mode and/or from a fuel cell mode to an electrolysis cell mode, by changing the reactive polymeric layers of the electrodes. The mode switching system gives command to roll up the reactive polymeric layer of the electrodes to switch the mode from an electrolysis cell mode to a fuel cell mode and/or from a fuel cell mode to an electrolysis cell mode.

In another one of the embodiments, the first electrode (1) acts as an oxidation electrode and the second electrode (2) acts as a reduction electrode in the electrolysis cell mode. The first electrode (1), for example, Pt—Ir—Ru—Fe dicarboxylated-complexed with chitosan-carbo nitride/graphene is spin coated on carbon nanofiber sheets. The second electrode (2), for example, Pt nanoparticles-iron dicarboxylates-polyvinylidene-composite with chitosan-carbo nitride/graphene was spin coated on boron-oxy carbide nanosheet.

In yet another one of the embodiments, the first electrode (1) acts as a reduction electrode and the second electrode (2) acts as an oxidation electrode in the fuel cell mode. The first electrode (1) for example, Zn—Ti oxide porous nanoparticles are directly grown via electrochemical methods on N—S doped graphene nanofibers is developed by chemical vapor deposition. The second electrode (2), for example, Pd—Co—Fe nanoparticles are generated on activated carbon cloths via electrochemical methods.

In one of the embodiments, the external energy source is selected from but not limited to solar energy, wind energy, water energy or electrical energy.

Figure 2A:
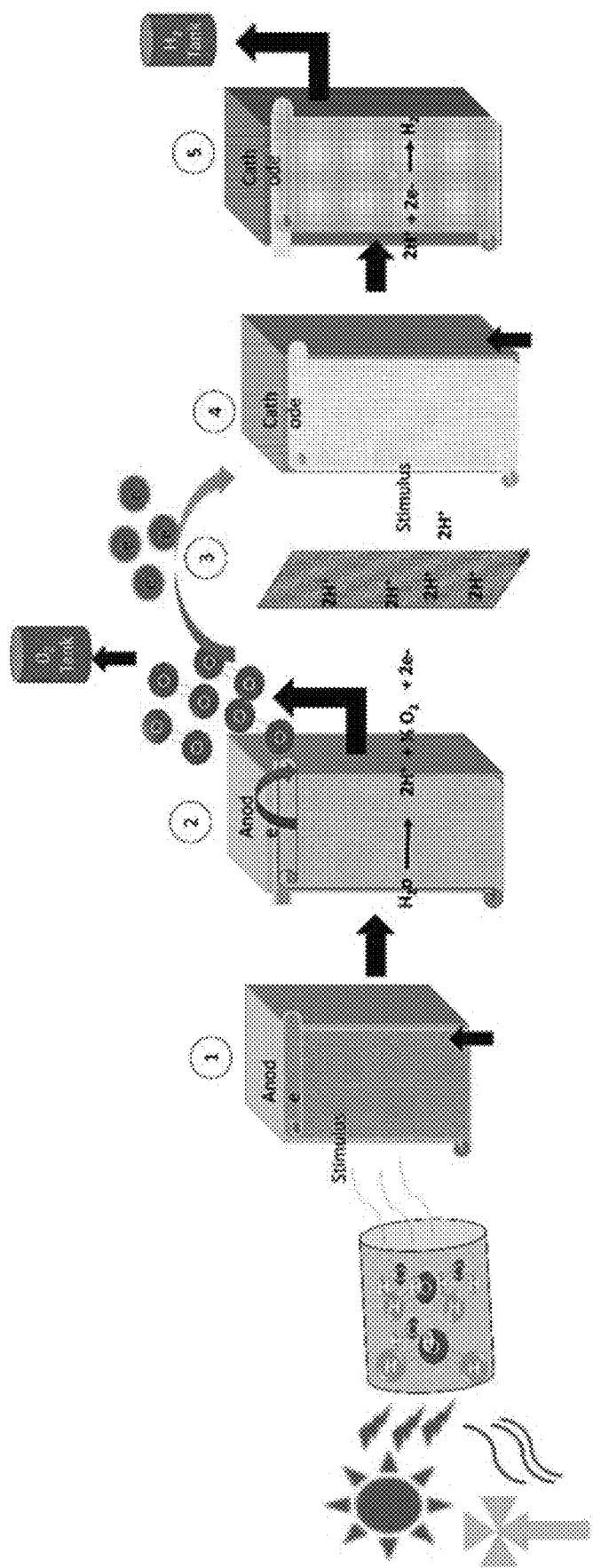
Figure 2B:
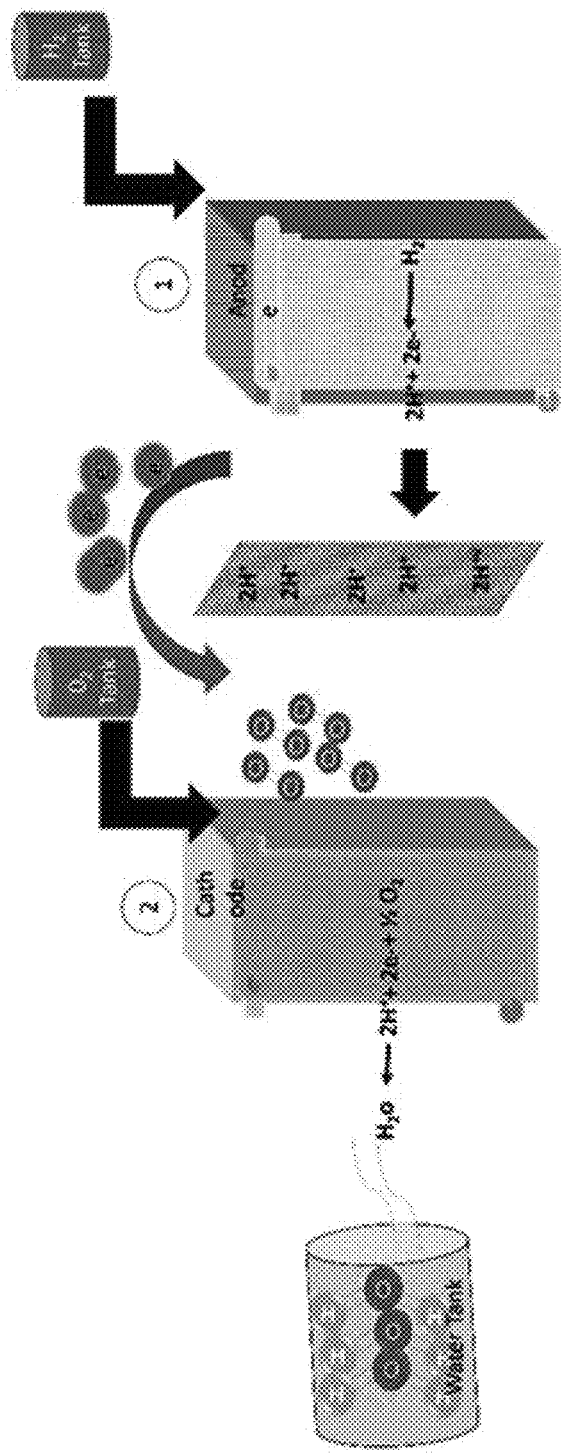

FIGS. 2(A) and 2(B) shows the working mechanism of a unitized regenerative fuel cell with a mode selective electrode assembly. As an energy storage system, the URFC "charges" and "discharges" like a rechargeable battery. While charging, the URFC operates in electrolysis cell mode, which splits water into hydrogen and oxygen. While discharging, the URFC operates in fuel cell mode, which combines hydrogen and oxygen and produces electricity.

Hydrogen and oxygen gases produced during electrolysis are stored into the gas storage tanks, gradually increasing the pressure in storage tanks. The management of hydrogen gas, oxygen gas and water inside the URFC depends on the materials and the construction the URFC. The proper management of reactants inside the URFC is important to achieve improved performance, high round trip efficiency and high lifetime of the URFC. The present disclosure provides a URFC comprising a mode selective electrode assembly which operates in dual mode and exhibits high round trip efficiency and high lifetime.

In electrolysis cell mode (charging mode), water acts as stimulus for folding up reactive polymeric layer (Pt—Ir—Ru-iron di-carboxylated-complexed with chitosan-carbo nitride/graphene) on carbon nanofiber sheet which will act as reduction electrode (cathode) in the fuel cell mode. So, in the presence of water, it is folded up. Further, water storage tank having pressure sensor acts as an indicator for mode switching system. Decrease in pressure in water tank and presence of water gives command to the reactive polymeric layer of first electrode acting as a reduction electrode to roll up and provide another conductive surface, such that the first electrode acts as an oxidation electrode (anode) to effectively participate in water splitting (electrolysis) reaction. The mode switching system also gives command to the reactive polymeric layer of second electrode acting as an oxidation electrode to fold up and provides reactive polymeric layer of second electrode to act as a reduction electrode to accept protons.

First electrode/Oxidation electrode/Anode:
$$2H_2O \rightarrow 4H^+ + O_2 + 4e^- \quad (1)$$

Second electrode/Reduction electrode/Cathode: $4H^+ + 4e^- \rightarrow 2H_2$ (2)

Overall reaction: $2H_2O \rightarrow 2H_2 + O_2$ (3)

In fuel cell mode (discharging mode), byproduct water and oxygen gases will act as stimulus for folding up reactive polymeric layer of electrode. Pressure increment in the water storage tank acts as an indicator and the mode switching system gives command to the folding up reactive polymeric layer of the first electrode acting as an oxidation electrode to roll up and provide reactive layer of first electrode to act as a reduction electrode to effectively participate in fuel cell reaction. The mode switching system also gives command to the reactive polymeric layer of second electrode acting as a reduction electrode to fold up and provides reactive polymeric layer of second electrode to act as an oxidation electrode to provide water as byproduct.

Second electrode/Oxidation electrode/Anode:
$$2H_2 \rightarrow 4H^+ + 4e^- \quad (4)$$

First electrode/Reduction electrode/Cathode: $4H^+ + O_2 + 4e^- \rightarrow 2H_2O$ (5)

Overall reaction: $2H_2 + O_2 \rightarrow 2H_2O$ (6)

Figure 3:
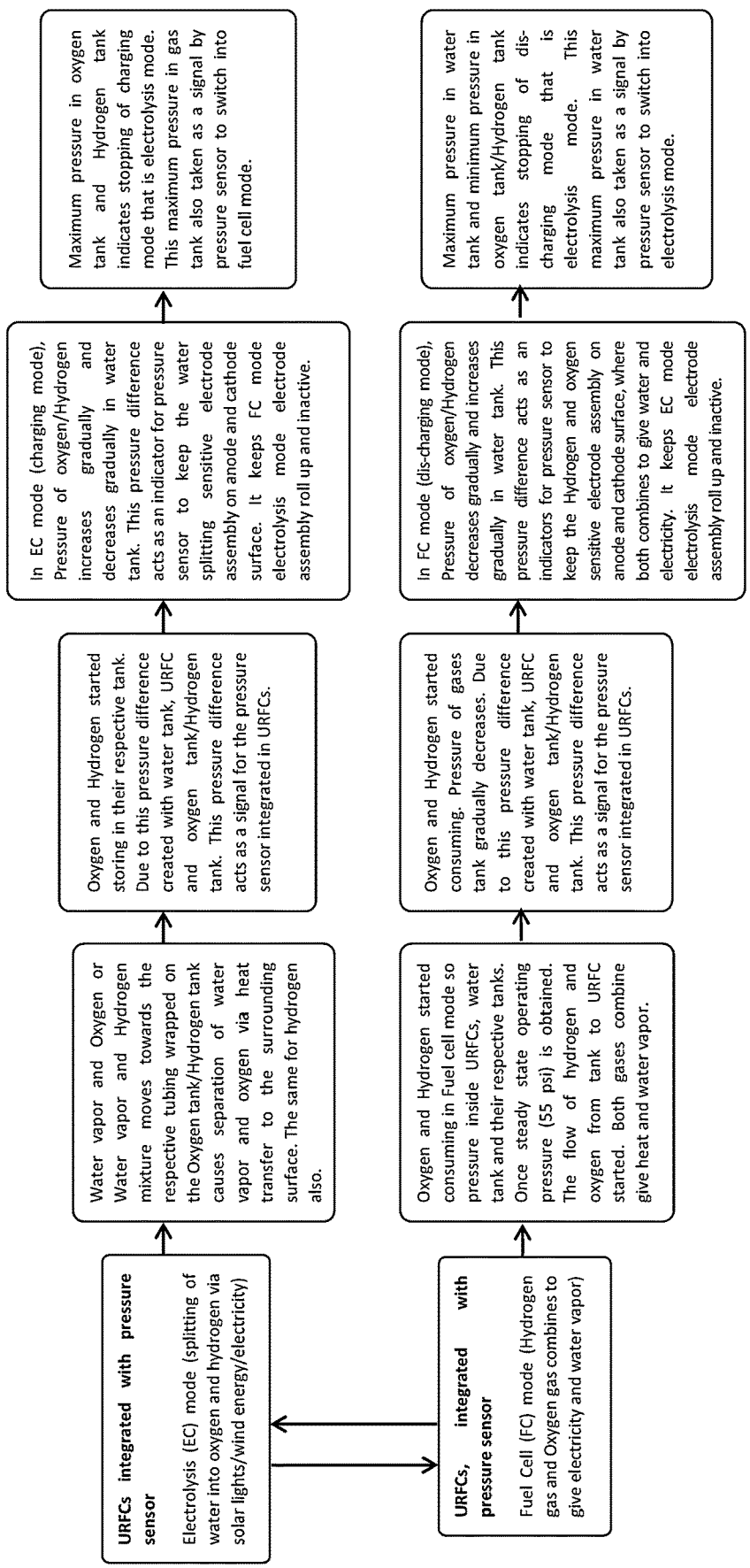
FIG. 3 shows flow diagram of operation of electrolysis cell mode and fuel cell mode of unitized regenerative fuel cell with mode selective electrode assembly.

FIG. 3 shows flow diagram of electrolysis cell mode and fuel cell mode of URFC with mode selective electrode assembly.

Further, the present disclosure relates to a method for operating the URFC, comprising:
supplying energy from an external energy source and water from a water storage tank to a mode selective electrode assembly in the URFC;
operating in an electrolysis cell mode wherein a first electrode of the mode selective electrode assembly acts as an oxidation electrode and a second electrode of the mode selective electrode assembly acts as a reduction electrode;
storing hydrogen gas as generated into one of the gas storage tank;
storing oxygen gas as generated into another gas storage tank;
automatically switching from the electrolysis cell mode to a fuel cell mode;
supplying hydrogen gas from one of the gas storage tank and oxygen gas from another gas storage tank to the mode selective electrode assembly;
operating the fuel cell mode wherein the first electrode of the mode selective electrode assembly acts as a reduction electrode and the second electrode of the mode selective electrode assembly acts as an oxidation electrode,
storing water as generated into a water storage tank;
storing electricity as generated into a power reservoir,
wherein the mode selective electrode assembly automatically switches from the electrolysis cell mode to the fuel cell mode and then automatically switches from the fuel cell mode to the electrolysis cell mode.

In one of the embodiments, the URFC is used in unmanned vehicles, long range electric vehicles, smart grids, aircrafts, space applications and portable systems such as mobiles, laptops and medical devices.

The URFC is eco-friendly, cost-effective, and works as an independent energy storage and power generation device that requires less space for operation. It can be one of the best alternatives of powering system in comparison to battery-based energy storage system.

The following examples are given to illustrate the present invention and should not be construed to limit the scope of the present invention.

EXAMPLES

Preparation of First Electrode

A first electrode is prepared by spin coating Pt—Ir—Ru—Fe di-carboxylated-complexed with chitosan-carbo nitride/graphene on activated carbon cloth. This first electrode is used as an oxidation electrode (anode) in the electrolysis cell mode.

For first electrode to be used as a reduction electrode (cathode) in fuel cell mode, Zn—Ti oxide porous nanoparticles are directly grown via electrochemical methods on N—S doped graphene nanofibers sheet developed by chemical vapor deposition. The mode switching system gives command to fold up the reactive polymer layers of first electrode.

Preparation of Second Electrode

A second electrode is prepared by spin casting Pt nanoparticles-iron dicarboxylates-polyvinylidene-composite with chitosan-carbo nitride/graphene was spin coated on boron-oxy carbide nanosheet. This second electrode is used as a reduction electrode (cathode) in the electrolysis cell mode.

For second electrode to be used as an oxidation electrode (anode) in the fuel cell mode, Pd—Co—Fe nanoparticles are generated via electrochemical methods. The mode switching system gives command to fold up the reactive polymer layers of second electrode.

Preparation of Mode Selective Electrode Assembly

A proton exchange membrane is arranged between the prepared first and second electrodes. The biodegradable polymers-inorganic nanofillers (Chitosan/Polyaniline-Silica-Titania) is used as a proton exchange membrane in URFC which enhances the conductivity by shorting the proton hopping distance.

Operation of URFC in Electrolysis Cell Mode

The prepared URFC is supplied with solar energy from external energy source and water from water storage tank.

Figure 4B:
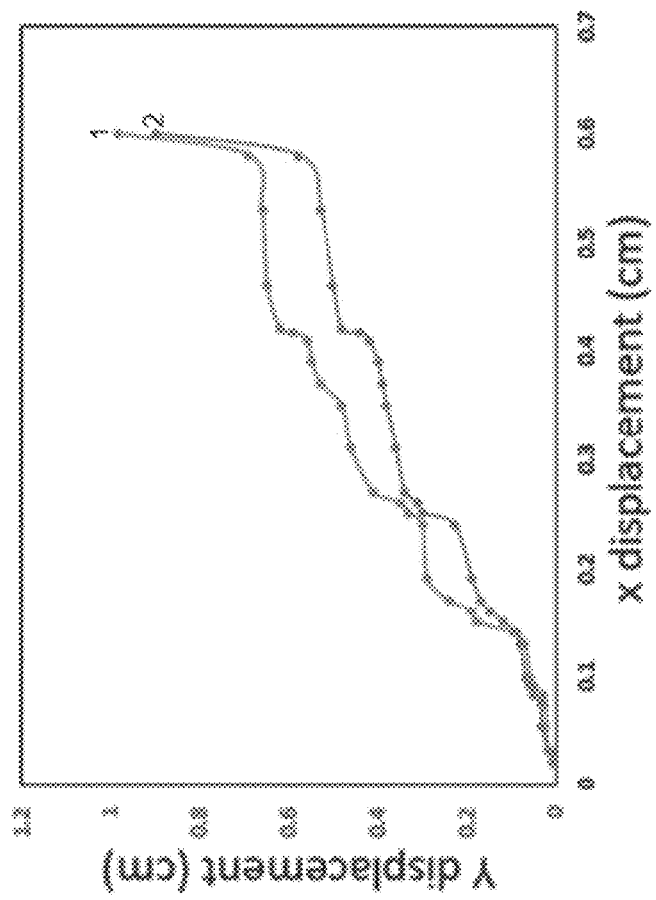
FIGS. 4A and 4B show comparative x and y displacement (cm) plot for oxidation electrode (1) and reduction electrode (2).
Figure 4A:
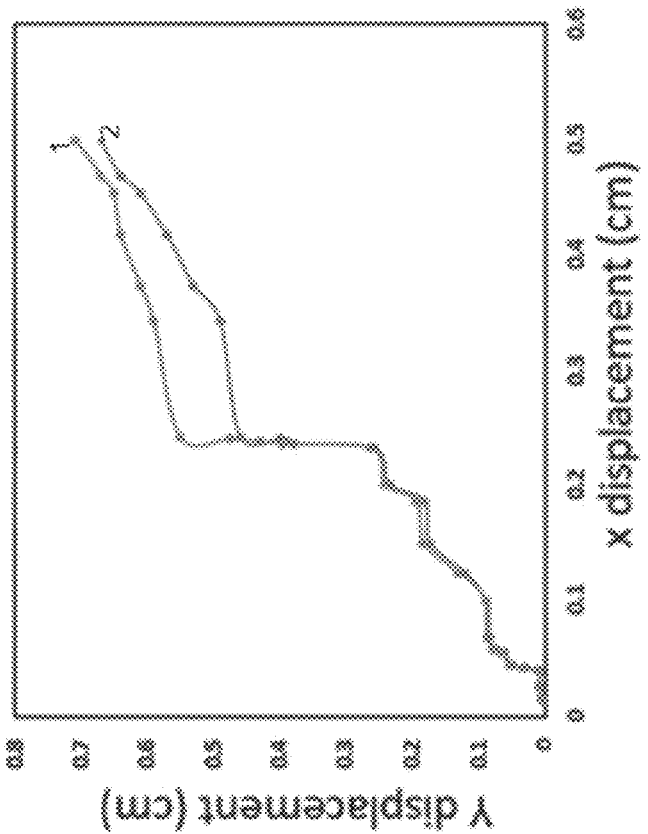

FIG. 4 shows comparative x and y displacement (cm) plot for oxidation electrode (2) and reduction electrode (2) (A) 15 seconds and (B) 30 seconds. In the graph, x and y indicates displacement during the folding up of the above two anodic and cathodic reactive polymer films to be for 15 seconds and 30 seconds, respectively. This plot provides the comparative study about the time taken for the complete folding and rate of folding of the anodic and cathodic reactive polymer films. As observed from this figure, the time taken by the reactive polymer films to completely fold is almost same at 15 seconds. After 30 seconds, folding rate of anodic film was little higher than cathodic film. This may be due to the water in liquid form is directly contacted to anodic films and due to more stimulus concentration, folding rate enhanced. In case of cathodic film, water vapors as a byproduct are contacted to reactive polymer layer thus folding rate after some period of time was not enhanced. This study decides the workability of the film in terms of designed invention.

Figures 5A, 5B:
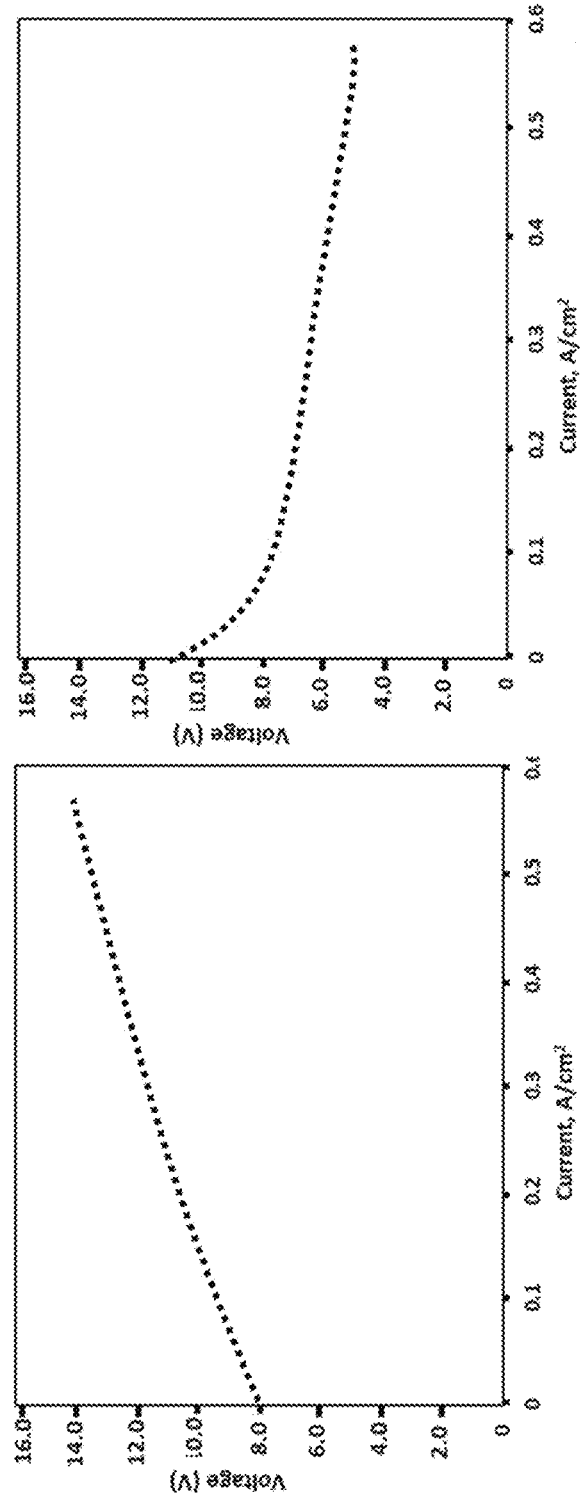
FIGS. 5A and 5B show the current-voltage polarization curve at (A) electrolysis cell mode and (B) fuel cell mode.

Then, the electrolysis cell performance was evaluated using a current density-voltage curve. The result is shown in FIG. 5. To determine the URFC system performance in electrolysis cell mode, preheated water (45° C.) was allowed to flow into the anode side with a constant flow rate of 1 mL min$^{-1}$. Before operation, the preheated water was fed for 8-10 minutes to supply sufficient reactant to the catalyst layer. The cell temperature was maintained at 60° C. and single cell tests were performed using the voltage sweep method with load cycling from 1.00 to 2.0V at 2.5 mV s$^{-1}$.

Operation of URFC in Fuel Cell Mode

After the evaluation in the electrolysis cell mode, the prepared URFC was supplied with hydrogen gas from one of the gas storage tank and oxygen gas from another gas storage tank. Then, the fuel cell performance was evaluated using a current density-voltage curve. The result is shown in FIG. 5.

The electrochemical performances of the URFC of present disclosure have been measured at 60° C., in both electrolysis cell mode and fuel cell mode of operation. FIG. 5 shows the obtained current-voltage polarization curve at (A) electrolysis cell mode and (B) fuel cell mode. Maximum current densities of 1.0 A cm$^{-2}$ have been obtained in both modes. The operational parameters are tabulated in Table 1.

TABLE 1

| | Operational Parameter of URFC (10 cells active area 200 cm$^2$) | | |
|---|---|---|---|
| Sr. No. | Parameters | Electrolysis cell mode | Fuel cell mode |
| 1. | Nominal Voltage (V) | 13.0 | 4.2 |
| 2. | Nominal Current (A) | 130 | — |
| 3. | Nominal Electric Power (W) | 1685 | 505 |
| 4. | Operating Temperature (° C.) | 60 | — |
| 5. | Operating Pressure of Hydrogen (bar) | — | 2.85 |
| 6. | Operating Pressure of Oxygen (bar) | — | 3.0 |
| 7. | Humidification of hydrogen, % | — | 75 |

The URFC of present disclosure exhibits high energy density and round-trip efficiency of 85% with 12,000-20,000 cycles. URFC performance was evaluated using the round-trip efficiency between fuel cell and electrolysis cell modes. The round-trip efficiency was calculated by dividing the cell voltage in fuel cell mode by that observed in electrolysis cell mode at constant current density of 400 mAcm$^{-2}$.

The advantages of the disclosed invention are thus attained in an economical, practical, and facile manner. While example have been shown and described, it is to be understood that various further modifications and additional configurations will be apparent to those skilled in the art.

What is claimed is:

1. A mode selective electrode assembly, comprising
   at least two electrodes having reactive polymeric layers on each side;
   a proton exchange membrane;
   a mode switching system,
   wherein the mode switching system changes from an electrolysis cell mode to a fuel cell mode or from a fuel cell mode to an electrolysis cell mode by folding up the polymeric reactive layers of the electrodes.

2. The mode selective electrode assembly as claimed in claim 1, optionally comprises of microporous layers, gas diffusion layers and bipolar plates.

3. A unitized regenerative fuel cell comprising, gas,
   a mode selective electrode assembly,
   at least two gas storage tanks with a pressure sensor for storing hydrogen gas and oxygen gas,
   a water storage tank with a pressure sensor,
   an external energy source, and
   a power reservoir for storing energy,
   wherein the mode selective electrode assembly, comprises of
   at least two electrodes having reactive polymeric layers on each side;
   a proton exchange membrane; and
   a mode switching system, wherein the mode switching system changes from an electrolysis cell mode to a fuel cell mode or from a fuel cell mode to an electrolysis cell mode by folding up the polymeric reactive layers of the electrodes.

4. The unitized regenerative fuel cell as claimed in claim 3, wherein the mode selective electrode assembly comprises of two electrodes—a first electrode, and—a second electrode.

5. The unitized regenerative fuel cell as claimed in claim 4, wherein the first electrode and the second electrode have a reactive polymeric layer on each side.

6. The unitized regenerative fuel cell as claimed in claim 4, wherein the proton exchange membrane comprises biodegradable polymers and inorganic nanofillers.

7. The unitized regenerative fuel cell as claimed in claim 4, wherein the first electrode acts as an oxidation electrode and the second electrode acts as a reduction electrode in the electrolysis cell mode.

8. The unitized regenerative fuel cell as claimed in claim 4, wherein the first electrode acts as a reduction electrode and the second electrode acts as an oxidation electrode in the fuel cell mode.

9. The unitized regenerative fuel cell as claimed in claim 3, wherein the external energy source is selected from solar energy, wind energy, water energy or electrical energy.

* * * * *